(12) United States Patent
Partridge

(10) Patent No.: US 6,370,579 B1
(45) Date of Patent: Apr. 9, 2002

(54) METHOD AND APPARATUS FOR STRIPING PACKETS OVER PARALLEL COMMUNICATION LINKS

(75) Inventor: Craig Partridge, El Cerrito, CA (US)

(73) Assignees: Genuity Inc., Burlington, MA (US); GTE Service Corporation, Irving, TX (US)

(*) Notice: Subject to any disclaimer, the term of this patent is extended or adjusted under 35 U.S.C. 154(b) by 0 days.

(21) Appl. No.: 09/176,420

(22) Filed: Oct. 21, 1998

(51) Int. Cl.7 .............................................. G06F 15/173
(52) U.S. Cl. ........................................ 709/226; 370/498
(58) Field of Search ................................. 709/230–235, 709/229; 710/20; 370/232, 255, 412, 480, 498, 535; 359/121–124

(56) References Cited

U.S. PATENT DOCUMENTS

| | | | | |
|---|---|---|---|---|
| 4,797,879 A | * | 1/1989 | Habbab et al. | 359/123 |
| 5,170,393 A | * | 12/1992 | Peterson et al. | 370/255 |
| 5,633,861 A | * | 5/1997 | Hanson et al. | 370/232 |
| 5,815,667 A | * | 9/1998 | Chien et al. | 709/232 |
| 5,909,594 A | * | 6/1999 | Ross et al. | 710/20 |
| 5,956,341 A | * | 9/1999 | Galand et al. | 370/412 |
| 6,094,683 A | * | 7/2000 | Drottar et al. | 709/226 |

OTHER PUBLICATIONS

Adiseshu et al., "A Reliable and Scalable Striping Protocol," Proceedings of ACM SIGCOMM'96 Conference 1996, vol. 26, No. 4, 1986, pp. 131–141.

* cited by examiner

Primary Examiner—Patrice Winder
(74) Attorney, Agent, or Firm—Leonard Charles Suchyta; James K. Weixel

(57) ABSTRACT

A system for performing packet based data communications over a parallel set of sublinks is provided. A transmitter unit separates the sublinks into an available set of sublinks and a busy set of sublinks. This transmitter avoids processing delays by utilizing sublinks in the available sublink set and not waiting for sublinks in the busy sublink set to be released. To receive the packets, a receiver unit utilizes a sequence number associated with each packet. Accordingly, the receiver extracts the one or more packets of data received in parallel over the set of sublinks in sequential order. A packet window buffer is used to store packets in sequence if they are initially received out of order. The receiver utilizes a sliding window to provide packets in continuous sequential order and transmits the packets serially over a single communication link.

20 Claims, 8 Drawing Sheets

METHOD AND APPARATUS FOR STRIPING PACKETS OVER PARALLEL COMMUNICATION LINKS

BACKGROUND OF THE INVENTION

1. Field of the Invention

This invention generally relates to data networking technologies and more particularly, to a method and apparatus for striping packets over parallel communication links.

2. Description of the Related Art

Increasing reliability and availability of high speed networks has fueled the growth of many new telecommunications based services. The Internet is one network being used to deliver electronic commerce (e-commerce), telecommuting, and interactive entertainment services around the world. Predicted growth in these network based businesses will continue to outpace the availability of bandwidth current telecommunication vendors can provide.

Telecommunication systems used on the Internet and other worldwide networks typically include local area networks (LANs) coupled to very high speed wide area networks (WANs). Many businesses use LANs because they are low in cost and the 10 Mbps to 100 Mbps bandwidth capacity they provide meets their networking needs. Other businesses, in contrast, set up WANs because they need higher bandwidth capacities and the benefits of high speed communication outweighs the increased costs.

In operation, companies design and configure WANs to operate in many different configurations. WANs can operate at a wide range of bandwidth capabilities ranging from tens of kilobits to gigabits per second. They also can transport variable size packets of data such as generated by different types of LANs.

Synchronous digital hierarchy (SDH) is one networking protocol used to carry data generated by a variety of communication systems including voice, data, and video. Presently, three different versions of SDH exist: SDH-Europe, SDH-Japan, and SONET for North America. These systems are essentially compatible and are referred to collectively as SONET.

Many WANs use SONET because it can accommodate different protocols and bandwidths such as T-1, T-3, and E-1. Network systems implementing SONET can strip the bandwidth off at geographically distant locations with little difficulty. SONET-based networks use add-drop multiplexers (ADM) to distribute high speed data at various geographic locations rather than conventional multiplexes that demultiplex and reagreggate bandwidth at each drop point. This design allows SONET to deliver high-speed data efficiently. Thus, SONET is desirable in video systems, interactive gaming, e-commerce, and other high bandwidth low-latency applications.

High speed SONET networks can transmit data at approximately 10-Gbps per second or OC-192. Essentially, OC-192 is 192 times faster than OC-1 (51.85 Mbps). The SONET and SDH operate at multiples of 51.85 Mbps to allow for efficient conversion from one data rate to the other.

Many companies have technical difficulties implementing high-speed OC-192 networks in practice. For example, OC-192 may not work well in networks with older transmission mediums because of the geometric irregularities or impurities in the transmission medium material. These irregularities or impurities can cause a signal frequency to shift over long distances and, through a phenomenon known as polarization-mode dispersion, introduce noise and distortion on the OC-192 communication link. Moreover, even with new cables, implementing OC-192 may be difficult without developing expensive optical transmitters that operate at very high frequencies and are prone to failure.

To overcome these difficulties, many WANs have achieved OC-192 and higher bandwidth by aggregating multiple lower speed optical or copper channels. These WANs combine many OC-48 channels using a technology known as wave division multiplexing or WDM. On a fiber optic network, WDM takes advantage of the inherent high bandwidth capacity of an optical fiber by transmitting data in parallel at different wavelengths. Lasers emitting different wave lengths allow these different channels to coexist on a shared optical medium. WDM uses different wave lengths to establish a separate sublink between the transmitter-receiver pair. The system receives the WDM transmission with optical receivers sensitive to the different wave lengths used during the transmission. Transmitting information in parallel over multiple sublinks increases the overall capacity on a SONET system.

Many WDM networks connect multiple parallel sublinks to a single communication link at a network junction. Specially designed network interconnect devices, such as routers or switches, pass data back and forth between the networks connected to this junction. These network interconnect devices can take data from the single communication link and distribute it in a predetermined manner over the multiple sublinks. Conversely, the network interconnect devices can also aggregate data from the multiple sublinks into a single data stream for transmission over a single communication link.

Packet-by-packet striping is one method of transferring data from a single link to multiple sublinks. Packet-by-packet striping distributes one packet on a first sublink and subsequent packets on subsequent sublinks. This technique distributes multiple packets over multiple sublinks and transmits the data in parallel. Typically, the first sublink that becomes available carries the packets for data transmission. This uses resources effectively but sends packets out of order and introduces additional processing overhead reordering the packets at the receiver.

Existing systems have had difficulty making packet-by-packet striping operate in a work conserving manner. In a work conserving system, server and network resources do not remain idle and transmit or receive data packets when they are ready in a queue. Unfortunately, systems that send packets in sequence leave some sublinks underutilized waiting to transmit the next sequential packet. Conversely, systems that send packets out of order can cause a receiver to occasionally pause while reordering packets. This pause can delay transmission of data on sublinks downstream from the receiver unit and underutilize these sublinks.

Packets sent out-of-order often require additional resources and storage. Each packet transmitted out-of-order in a packet-by-packet striping scheme has sequencing information associated with each packet. As a result packets may have to be enlarged to hold sequencing information. This can lead to increased buffer sizes and may impact utilization of other network related resources.

One method of performing packet-by-packet striping over multiple parallel channels while maintaining packet ordering was suggested in "A Reliable and Scalable Striping Protocol," by H. Adiseshu, G. Parulkar, and G. Varghese, ACM SIGCOMM, Volume 26, Number 4, pg. 131–141, October 1996. This packet-by-packet striping technique, known as strIPe, sends packets in sequence without placing explicit sequence numbers in each packet. Like other conventional systems, this technique is also not work conserving and can leave network bandwidth under utilized.

In strIPe, a byte counter associated with each sublink represents the number of bytes a sublink can transmit in a time interval. Sublink initialization sets each byte counter to a positive value corresponding to the sublink's transmission bandwidth. If each of the parallel sublinks has the same bandwidth, the sublink initialization sets each byte counter to the same value. Sublinks with different bandwidth are initialized to different values.

A transmission device sends a packet on a first sublink in the parallel sublink set and subtracts the packet size in bytes from the byte counter associated with the first sublink. When the decremented byte counter indicates a negative number, the transmission device selects a subsequent sublink to transmit packets. Meanwhile, the byte counter associated with the sublink is reinitialized to the original starting value. This process is repeated until all the additional packets are transmitted.

A receiver reverses this process to read packets from the multiple parallel sublinks. Initially, the receiver reads packets off the first sublink. The number of packets the receiver will read off the first sublink depends on the bandwidth of the first sublink and the initialization value used to initialize the first sublink's byte counter. Once the initial group of packets have been read from the first sublink, the receiver reads additional packets from subsequent sublinks in a similar manner.

The strIPe technique maintains packet ordering but is not completely work conserving. A transmitter sends multiple packets over a single sublink until the sublink has reached a predetermined transmission capacity. Meanwhile, other parallel sublinks remain idle. This is not work conserving because some sublinks may remain idle while unsent packets are in the queue ready for transmission.

The strIPe process may also not transmit packets in order if the sublinks transmit data at different data rates. Packets transmitted over a high speed sublink may arrive at the receiver before packets transmitted over a slower low speed sublink. Consequently, it is possible that the receiver will wait for packets on the slower low speed sublink because packets later in the data sequence and transmitted on the faster sublink have already arrived. This is inefficient and not work conserving because the receiving unit must wait for a packet on a slower sublink and delay processing data on the faster sublink.

It is therefore desirable to develop a new technique to distribute data from a single link to multiple parallel sublinks on a network and to aggregate data from multiple parallel sublinks back onto the single link.

SUMMARY OF THE INVENTION

In one aspect of the present system, a method and apparatus for performing packet based data communications over a parallel set of sublinks is provided. Typically, the method is executed on a processor coupled to two or more parallel communication sublinks and a single sublink. The method transmits packets received over the single sublink by striping the packets over each sublink in a novel and efficient manner. Initially, the method receives data packets serially over a single communication link. Next, the method separates the sublinks into an available set of sublinks and a busy set of sublinks. Packets ready for transmission are then striped over sublinks in the available sublink set.

In another aspect of the invention, a method for receiving packets over more than two or more sublinks is also provided. This method receives one or more packets of data in parallel over a set of available sublinks. Using a sequence number associated with the header of each packet, the method extracts the one or more packets of data received in parallel over the set of sublinks as they arrive. A packet window buffer stores packets in sequential order even if they are initially received out of order. The method utilizes a sliding window to provide packets that are in continuous order. Finally, the method transmits data packets serially over a single communication link at a bandwidth at least greater than the bandwidth available on any one of the sublinks in the set of sublinks.

Using implementations of the present invention, the transmitter and communication sublinks of a network operate in a work conserving manner. That is, the transmitter and communication sublinks do not remain idle when packets are available for transmission. At the possible expense of reordering packets at the receiver, this configuration utilizes the transmitter and communication sublinks in an efficient manner.

BRIEF DESCRIPTION OF THE DRAWINGS

The accompanying drawings, which are incorporated in and constitute a part of this specification, illustrate an embodiment of the invention and, together with the description, serve to explain the principles of the invention.

In the drawings.

DETAILED DESCRIPTION

Overview

Systems and methods consistent with the present invention can be used to stripe packets of data over parallel sublinks in a local area network (LAN) or wide area network (WAN). A transmitter stripes packets over multiple sublinks as the sublinks become available. This keeps the transmitter and sublinks busy and does not leave time for them to remain idle. A receiver uses a packet sequence stored within each packet to reorder the packets received in a packet window buffer. A sliding window associated with a contiguous sequence of packets in the packet window buffer extracts the packets in sequence.

A system designed in accordance with the present invention transmits packets over an optical fiber or other transmission medium synchronized from one or more clocks. Further, the system includes multiple parallel links that operate at the same bandwidth or multiples of the same bandwidth such as OC-1 (51.85 Mbps). For example, a SONET system using WDM (Wave Length Division Multiplex) can use a single optical fiber to establish multiple sublinks. These multiple sublinks are established over a single fiber using numerous laser devices transmitting information over different predetermined wave lengths. Each sublink receives a clocking signal generated by multiple highly accurate synchronized clocks at various points on the network. These clocks can be atomic based clocks or clocks synchronized via Global Positioning Satellites (GPS) well known in the art. Having these closely synchronized clocks avoids clock drift that may occur when data is communicated over the large distances spanned by the network.

Computer Network

Figure 1:
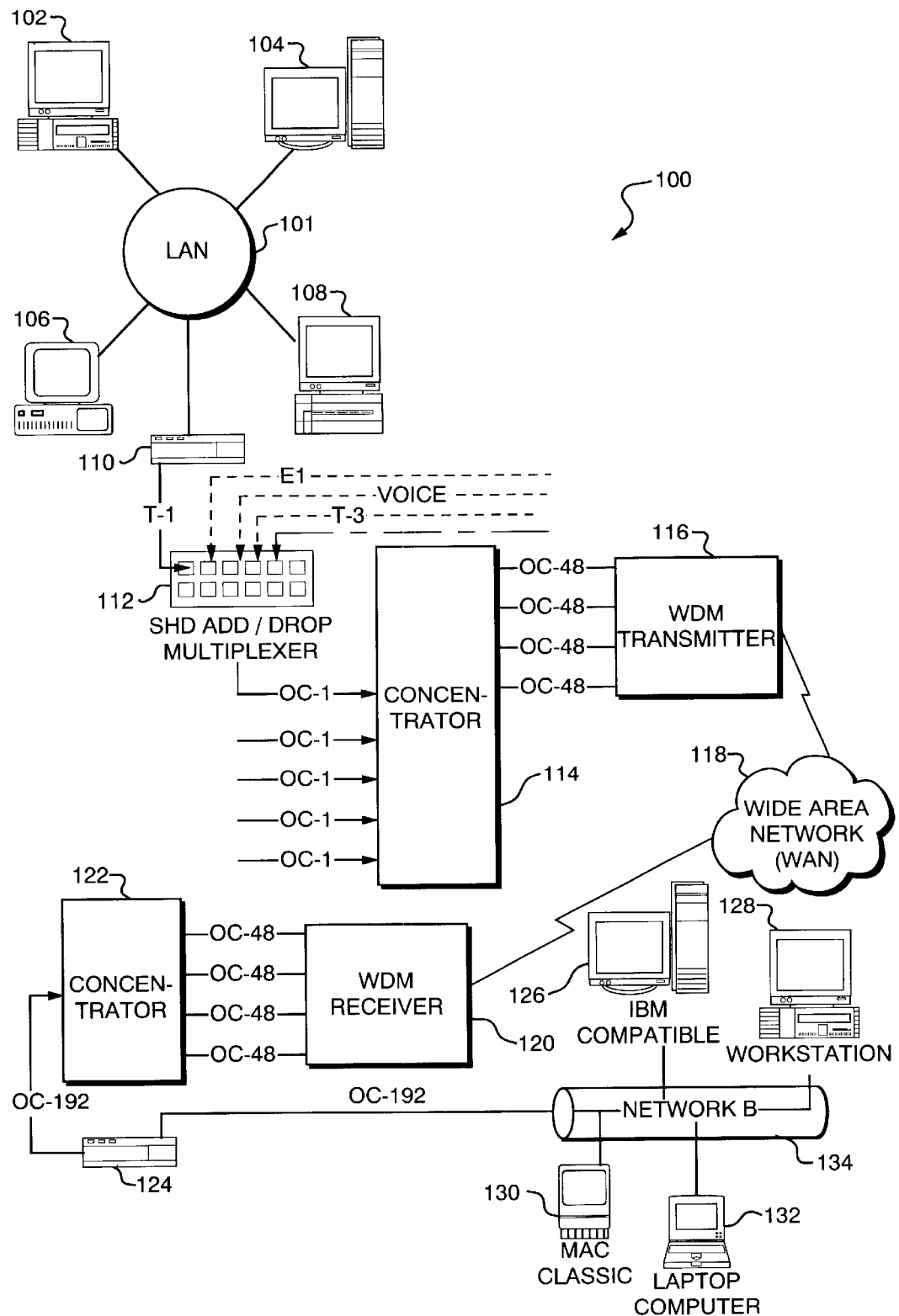
FIG. 1 illustrates a computer network in which one embodiment of the present invention can be implemented.

FIG. 1 illustrates a computer network in which one embodiment of the present invention can be implemented. The exemplary computer network in FIG. 1 is for descriptive purposes only and although the description may refer to terms commonly used in describing particular computer systems such as an IBM compatible computer, a workstation or a Macintosh computer, the description and concepts equally apply to other computer systems, network devices, and network interconnect devices such as routers, switches and hubs.

Computer network 100 in FIG. 1 includes Local Area Network (LAN) 101, backbone or Wide Area Network (WAN) 118, and Local Area Network (LAN) 134. LAN 101 includes a series of workstations and server computers 102, 104, 106, and 108. These computer systems 102–108 are coupled to the network in order to share information, transmit data, and potentially share computational capabilities. LAN 101 is coupled to the larger overall network using a network interconnect device 110. The specific type of network interconnect device can be a router, a switch, or a hub depending on the particular network configuration. Usually, network interconnect device 110 includes routers, switches, hubs or other types of network interconnect devices capable of coupling together LAN 101, and WAN 118. Implementations of the present invention may be physically embedded in network interconnect device 110, concentrator 114, or any other device connected to computer network 100.

In one configuration, network interconnect device 110 is coupled to an add/drop multiplexor 112 (ADM) and a first concentrator 114. ADM 112 allows network connections such as E-1, Voice, and T-3 to be connected into network interconnect device 110 and first concentrator 114. First concentrator 114 can transmit information at up to OC-192 or 10 Gbps per second over four OC-48 sublinks going into a WDM transmitter 116. A system designed with this high speed capability is especially useful in video conferencing, interactive gaming, or other high band width low latency network based applications.

Concentrator 114 utilizes packet-by-packet (PBP) striping designed in accordance with the present invention to exploit available bandwidth in the parallel communication sublinks typically found in networks using WDM (Wave Division Multiplexing) and SONET. As illustrated in FIG. 1, WDM transmitter 116 receives signals over four sublinks provided by concentrator 114. WDM transmitter 116 translates the signals transmitted over these four sublinks into corresponding optical signals and sends them over a fiber optic network within WAN 118. For example, first concentrator 114 can transmit high speed digital communication received at OC-192 or 10 Gbps per second using PBP striping of the present invention over 4 OC-48 sublinks. WDM transmitter 116 converts these signals transmitted over the 4 OC-48 sublinks to optical signals suitable for transmission over WAN 118.

On the receiving end, a WDM receiver 120 receives signals over a single link connected to WAN 118. WDM receiver 120 distributes signals received by WDM receiver 120 over parallel sublinks connected to a second concentrator 122 which also has PBP striping capability in accordance with the present invention. Second concentrator 122 demultiplexes information transmitted over the parallel sublinks provided by WDM receiver 120. This information is processed and reassembled into a single high speed OC-192 communication link and transmitted to a high speed network interconnect device 124. In one embodiment, network interconnect device 124 is coupled directly to LAN 134. In turn, LAN 134 provides high speed communication capabilities to computer systems 126, 128, 130, and 132.

Network Interconnect Device

Figure 2:
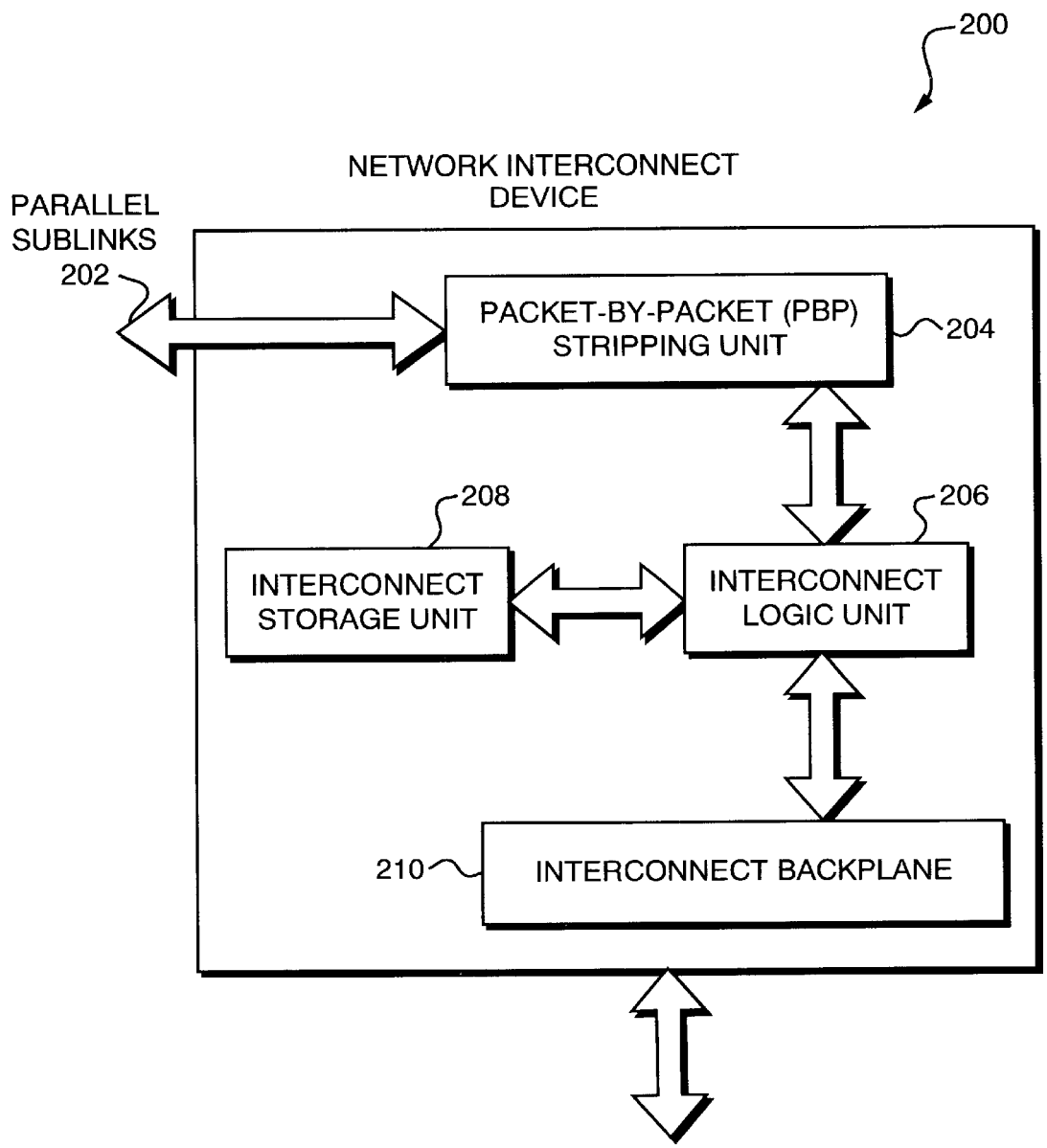
FIG. 2 is a block diagram of an exemplary network interconnect device designed consistent with the present invention.

Referring now to FIG. 2, an exemplary network interconnect device 200 designed in accordance with the present invention is illustrated. Those skilled in the art of designing and building network devices will understand how to integrate a PBP striping subsystem designed in accordance with the present invention together with existing network interconnect devices based upon the figures and the discussion provided below.

Network interconnect device 200 in FIG. 2 includes a PBP striping unit 204 operatively coupled to parallel sublinks 202. In one embodiment, parallel sublinks 202 each have a bandwidth of M and the aggregate bandwidth is approximately M times the number of parallel sublinks. PBP striping unit 204 is also coupled to an interconnect logic unit 206 to further process data provided over parallel sublinks 202. Interconnect logic unit 206 includes the circuitry and logic necessary for the corresponding type of network interconnect device being used in the network configuration. For example, interconnect logic unit 206 can include logic corresponding to a router device, a switching device or an intelligent hub device. Interconnect logic unit 206 can be constructed from field programmable gate arrays (FPGA) or application specific integrated circuits (ASICs). As illustrated in FIG. 2, interconnect back plane 210 is coupled directly to interconnect logic 206. Computers and other devices connect to the network through interconnect back plane 210. For example, interconnect back plane 210 can be a single communication link using SONET, Ethernet, Token-Ring, SDLC, HPPI, or other network protocols.

For storing information, an interconnect storage unit 208 is coupled to interconnect logic unit 206. Interconnect storage unit 208 stores information related to processing data transmitted over the network. Interconnect storage unit 208 can be constructed from random access memory (RAM) or other types of high speed storage devices. Those skilled in the art will understand that many different types of network interconnect devices can be developed that use PBP striping unit 204.

Figure 3:
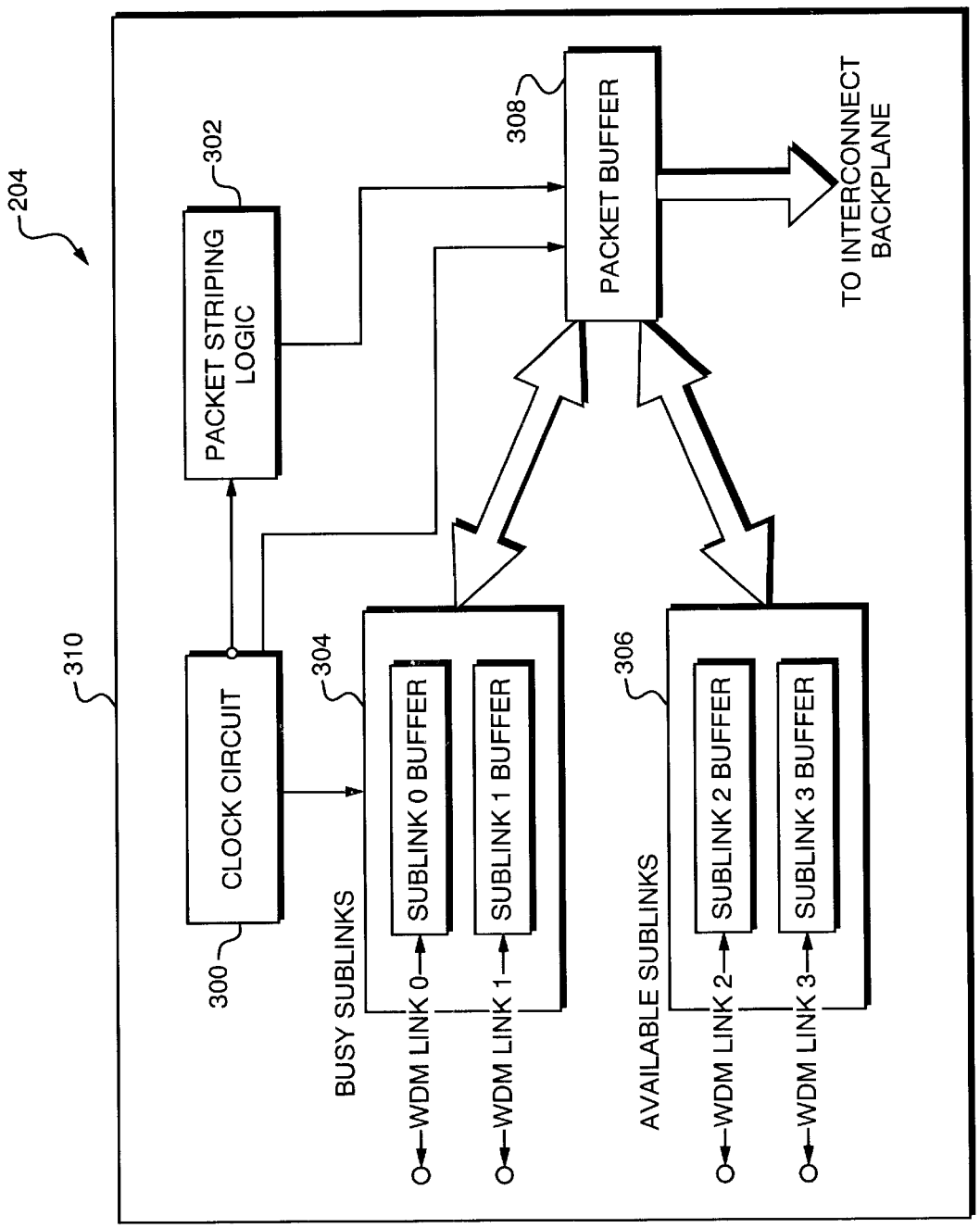
FIG. 3 is a block diagram illustrating a packet-by-packet striping unit designed consistent with the present invention.

FIG. 3 includes a block diagram of a transmitter with PBP striping unit 204 designed in accordance with the present invention. Transmitter 310 of PBP striping unit 204 includes a clock circuit 300 coupled to a packet striping logic 302 and a packet buffer 308. Clock circuit 300 is also coupled to a set of busy sublinks 304 and a set of available sublinks 306. Busy sublinks 304 includes those parallel links that are busy transmitting information, being initialized, or are no longer in service for other reasons. These busy sublinks 304 may be temporarily or permanently unavailable. In contrast, available sublinks 306 are initialized and available for transmitting data across the network.

In operation, interconnect back plane 210 collects high-speed data and stores information in packet buffer 308. Transmitter 310 extracts information from packet buffer 308 and sends the information over one of the parallel sublinks. Transmitter 310 checks available sublinks 306 and determines which sublinks to use for transmission. Available sublinks 306 are represented in software or can be tracked by storing information directly in hardware such as cache or memory.

Transmitter 310 can transmit information once available sublinks 306 indicate a sublink is available. If a sublink is not available, transmitter 310 blocks or waits for a sublink to become available. Those sublinks in use or temporarily unavailable are associated with busy sublinks 304. To enable data transmissions, clock circuit 300 synchronizes transmitter 310 with the receiver.

Figure 4:
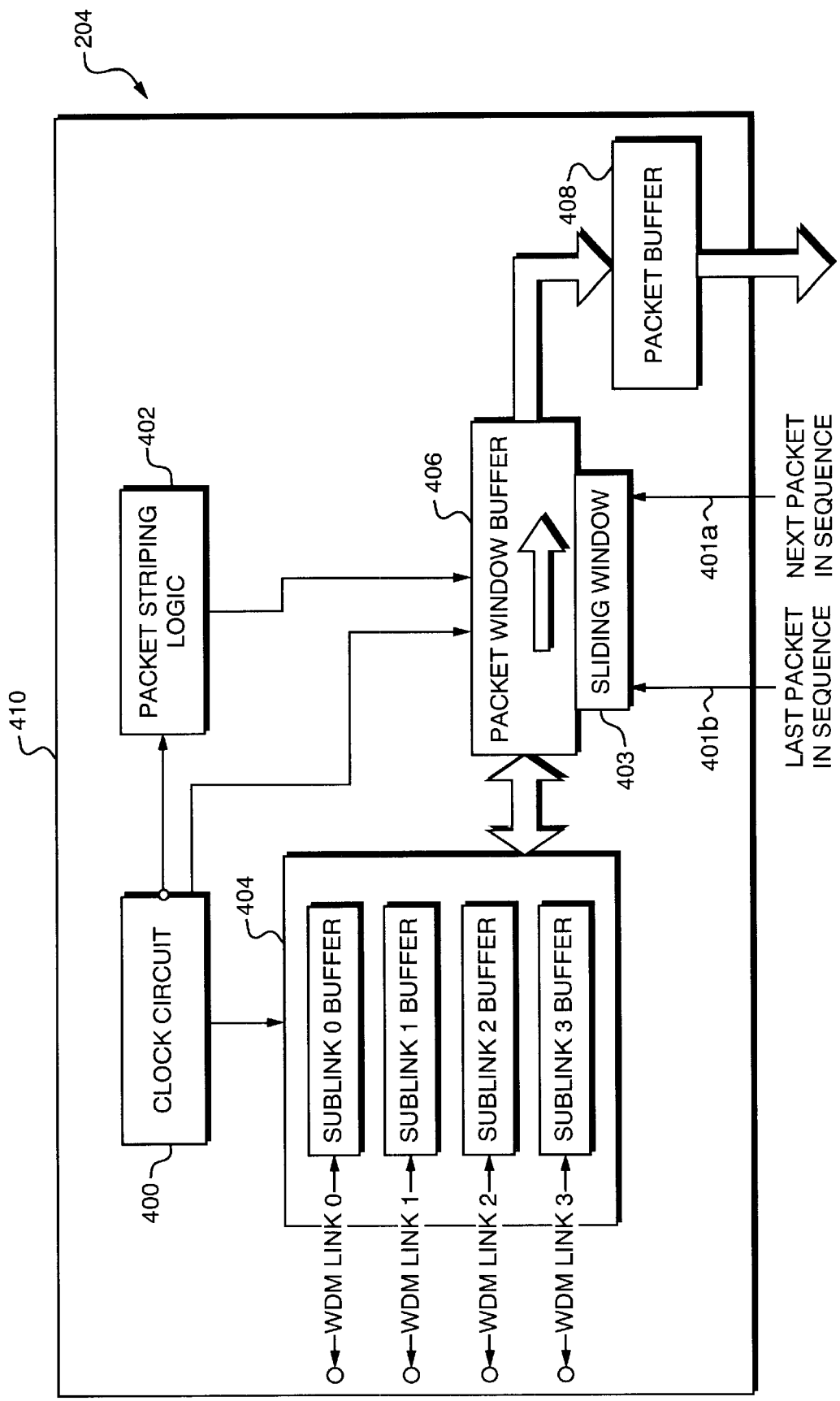
FIG. 4 is a block diagram illustrating a receiver with a packet-by-packet striping unit designed consistent with the present invention.

Referring to FIG. 4, a block diagram illustrates a receiver 410 associated with PBP striping unit 204 of the present invention. Features illustrated in FIG. 4 have been included to emphasize subsystems associated with receiver 410. The illustration in FIG. 4, however, does not preclude the addition of additional subsystems, logic elements, or circuitry as one skilled in the art would find necessary in its implementation and design. Receiver 410 includes a clock circuit 400 coupled to a packet striping logic 402 and a packet window buffer 406. Clock circuit 400 is also coupled to a sublink set 404 that includes corresponding sublink buffers.

In operation, sublink set 404 includes sublinks that may operate at different bandwidths. These sublinks may also carry variable size data packets. Consequently, packets transmitted over each parallel link can arrive at different intervals. Packet striping logic 402 detects when packets arrive over each sublink and processes the packets as they arrive. Packet striping logic 402 reads header information from each packet indicating the packet sequence. This packet sequence determines where the packet should be inserted in packet window buffer 406. Packet striping logic 402 also determines when sequential packets have arrived in packet window buffer 406 and moves them to packet buffer 408.

A sliding window 403 associated with packet window buffer 406 is used to marshall a set of packets for transmission to the high-speed back plane associated with packet buffer 408. Sliding window 403 can be implemented in either hardware or software using an array of storage elements. As illustrated in FIG. 4, the rightmost edge of sliding window 403 corresponds to the next sequential packet to be processed while the leftmost edge of sliding window 403 corresponds to the last allowable packet in packet window buffer 406. Packets associated with the rightmost edge of sliding window 403 have a logically lower address sequence than packets associated with leftmost edge of the sliding window. Overall, the size of sliding window 403 corresponds to the maximum number of packets one can receive in parallel during a given time interval.

To reorder the packets, receiver 410 checks the sequence number associated with each packet received and places it in the appropriate address space within sliding window 403. If a packet is at the rightmost portion of sliding window 403, then the packet is sent to packet buffer 408 and onto interconnect backplane 210. The next packet is made available by shifting the sliding window 403 to the left by one packet buffer. Receiver 410 continues processing packets in this manner until the rightmost portion of sliding window 403 encounters a packet out of sequence or no packet. When this occurs, receiver 410 pauses for a predetermined time interval waiting for the next packet in sequence to arrive. If the packet does not arrive and the time interval elapses, receiver 410 advances sliding window 403 and leaves retransmission of the packet and error control to the upper layers of the network. Information on sliding windows can be found in, "Computer Networks", by Andrew S. Tanenbaum, Prentice Hall Press, 2nd edition, 1988, pg. 223–239 incorporated herein by reference. Details on the operation of transmitter 310, receiver 410, and sliding window 403 associated with PBP striping unit 204 are discussed in further detail below.

Figure 5:
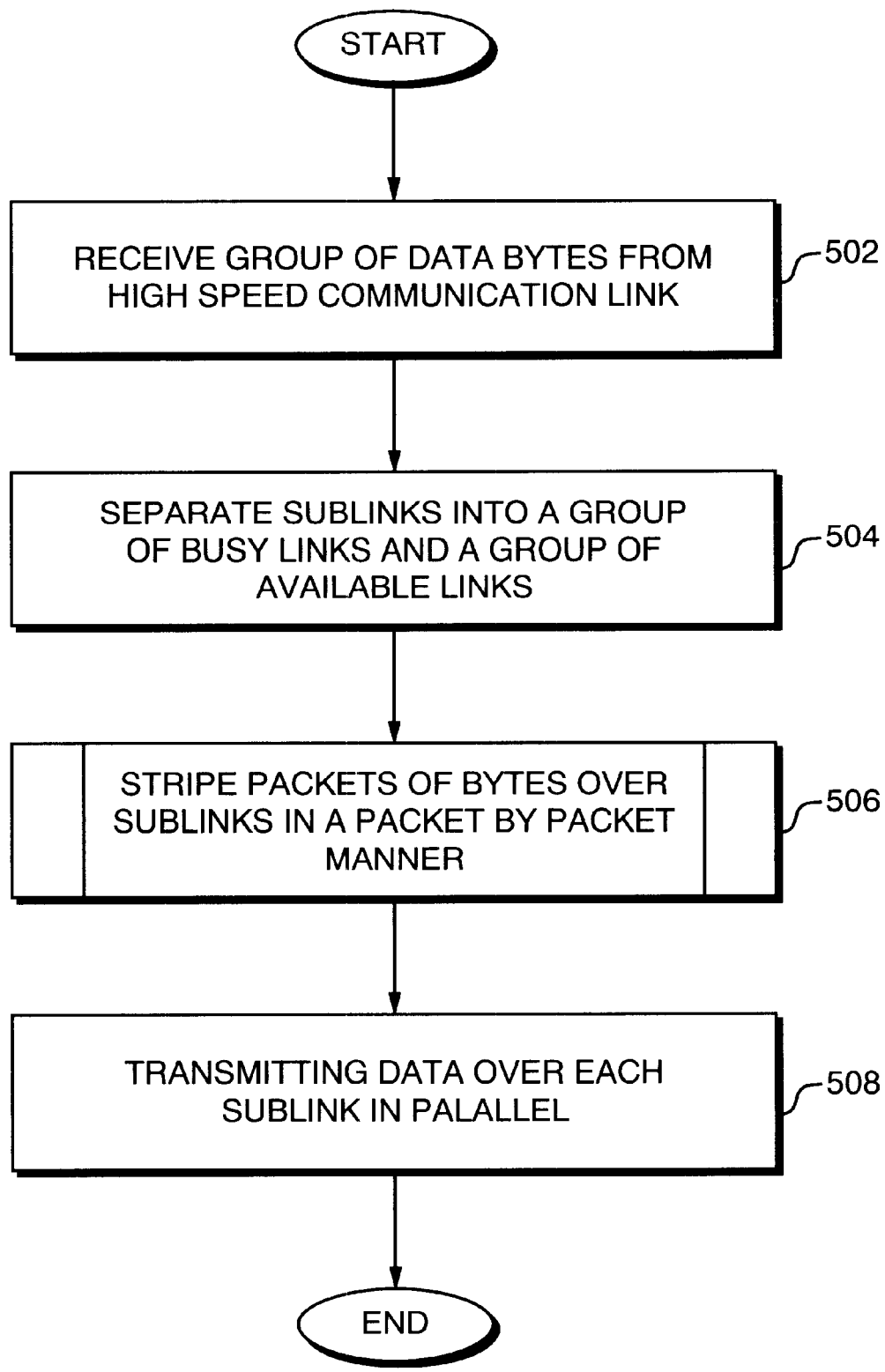
FIG. 5 is a flow chart diagram providing the steps for transmitting data using a packet-by-packet striping method in accordance with one embodiment of the present invention.

FIG. 5 is a flow chart providing the steps for transmitting data using packet-by-packet striping implemented in accordance with the present invention. Those skilled in the art will understand that the steps indicated in FIG. 5 are merely one method of utilizing the communication architecture discussed above.

Initially, packet buffer 308 receives one or more packets from a high-speed communication link (step 502). Next, sublinks are separated into a busy sublink set and an available sublink set (step 504). Keeping track of the busy links and available links can be done using a bitmap or other hardware or software implementations. Alternatively, hardware implementations to keep track of the busy links and the available links can be utilized as well. With either implementation, this information can be processed in parallel to improve performance.

Figure 6:
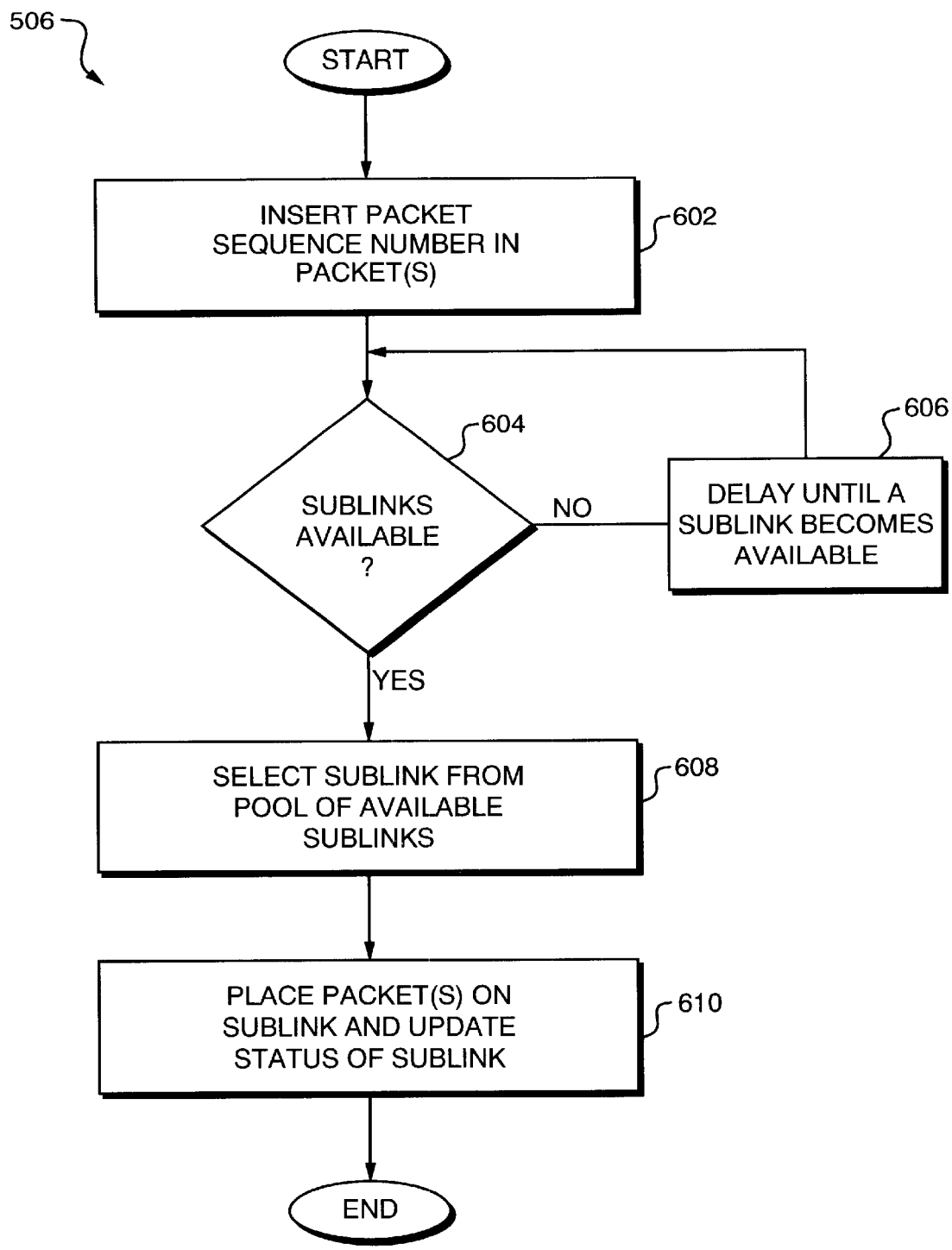
FIG. 6 is a flow chart diagram providing the steps associated with striping packets of data over parallel sublinks in accordance with one embodiment of the present invention.

Once the sublinks have been separated into a busy sublink set and an available sublink set, transmitter 310 stripes packets of bytes over sublinks in the available sublink set (step 506). Detailed steps associated with striping packets of data over the various sublinks at step 506 are illustrated in FIG. 6 and discussed in further detail below. Available sublinks are used to transmit packets in parallel to a receiver unit (step 508).

Referring to FIG. 6, a flow chart diagram illustrates steps associated with striping packets of data over parallel sublinks in accordance with the present invention. These steps correspond to step 506 in FIG. 5. Initially, a transmitter inserts a packet sequence number in a header associated with each respective packet to be transmitted in parallel over the sublinks (step 602). These packet sequence numbers are used to distinguish packets as they are stored in sliding window 403 and may be reused later with other packets later in the transmission. Because the sequence of numbers are limited, the additional storage required to store the sequence numbers in each packet is correspondingly minimized.

The transmitter determines if there are sublinks available for transmitting each packet having a sequence number (step 604). If no sublinks are available, the transmitter delays the transmission process until a sublink becomes available in the available sublink set (step 606). Alternatively, if a sublink is determined to be available (step 604), the transmitter selects a sublink from the pool of available sublinks (step 608). Next, the transmitter places the packet or packets on the one or more sublinks (step 610). Multiple packets can be transmitted over a sublink if the sublink has the capacity. The transmitter may also change the sublink status. If the sublink can not transfer additional packets, it is taken out of the available sublink set and placed temporarily in the busy sublink set. Conversely, if a sublink has additional bandwidth to transmit more packets, the sublink may be taken out of the busy sublink set and placed in the available sublink set.

Figure 7:
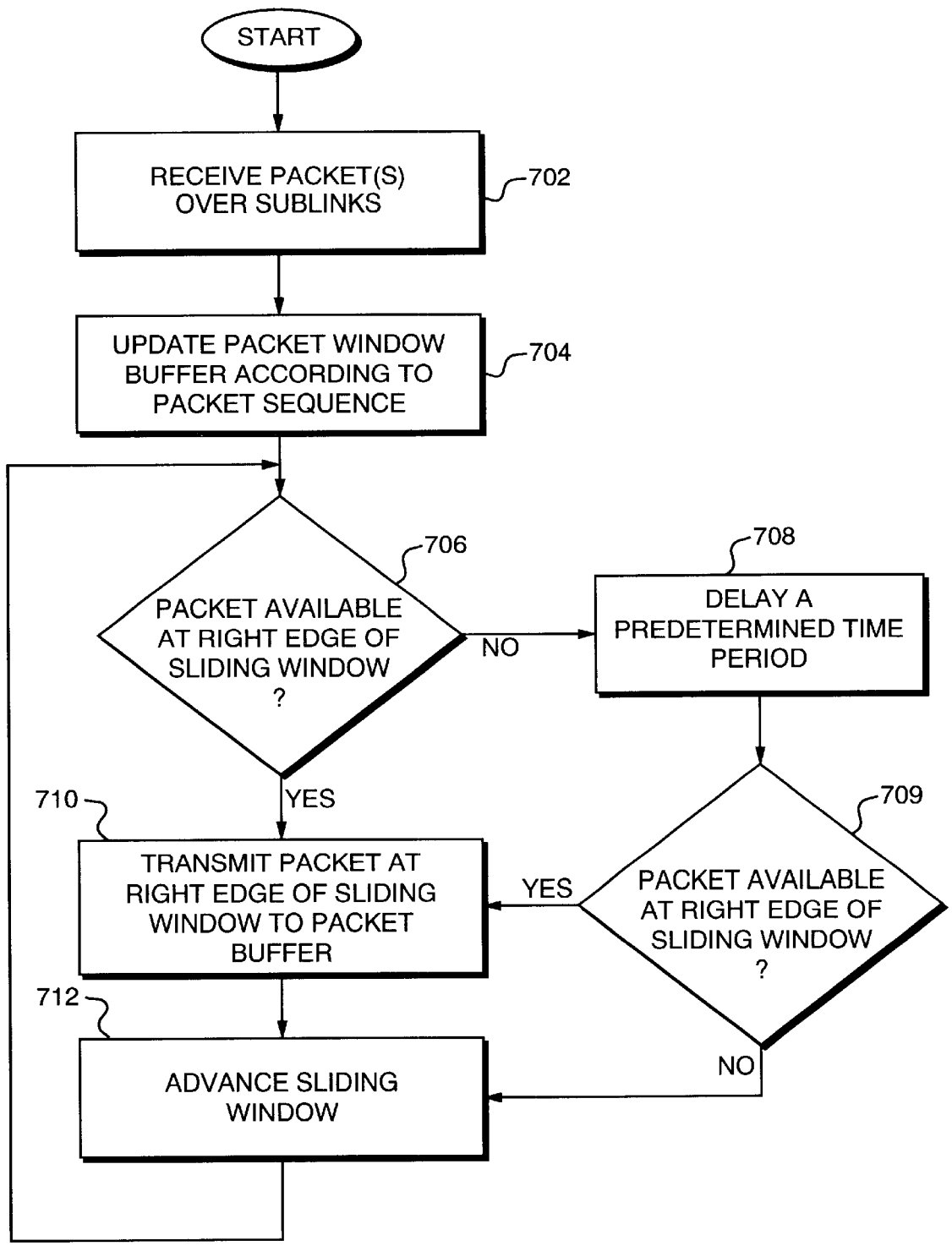
FIG. 7 is a flow chart diagram indicating the steps associated with receiving packets over multiple parallel links.

FIG. 7 is a flow chart diagram of the steps associated with receiving packets transmitted in parallel over multiple sublinks. Initially, receiver 410 receives one or more packets over the parallel sublinks (step 702). These packets are received and stored in the sublink buffers within sublink set 404. Next, receiver 410 updates packet window buffer 406 according to a packet's sequence number (step 708). Receiver 410 opens each packet header to determine the packet sequence number. These packets are inserted in window packet buffer 406 according to their sequence. If some packets are received out of order, packets are inserted in packet window buffer 406 with gaps in the entries.

The range of packet sequence numbers and the size of packet window buffer 406 depends on various parameters associated with the communication system. For example, the packet window buffer size must be large enough to accommodate a maximum number of packets that can be transmitted over the parallel links in a particular time interval. This particular time interval could correspond to the time it would take to send an average sized packet over the slowest of the parallel links.

Receiver 410 determines if a packet is available at the right edge of sliding window 403 (step 706). To do this, sliding window 403 frames a subrange of slots within packet window buffer 406 that are likely to contain a sequence of packets. Details on selecting the appropriate size of sliding window 403 depends on the number of communication parameters and is discussed in further detail below.

If the determination indicates that a packet is currently available at the right edge of the sliding window, receiver 410 transmits the packet available at the right most edge of the window to packet buffer 408 (step 710). Next, receiver 410 advances sliding window 403 and attempts to transfer the next packet available in the sequence (step 712). A processing delay in the receiver may occurs if the receiver has not received the next packet of the sequence. Many packets can be transmitted in sequence by repeating the steps discussed above in steps 706, 710 and 712. Alternatively, if the next packet in the sequence is not available at the right edge of sliding window 403, the transmitter delays a predetermined time period (step 708). This delay does not delay data transmission because packets are being stored in buffers such as packet window buffer 406. By buffering the packets, receiver 410 does not limit transmission of packets even when they are received out of order. Once the predetermined time period expires or a packet arrives, receiver 410 again determines if a packet is available at the right edge of sliding window 403 (step 709). If a packet is available, receiver 410 transmits packet at right edge of sliding window 403 to packet buffer 408 (step 710). If a packet is not available, receiver 410 advances sliding window 403 (step 712) and continues processing other packets. Receiver 410 leaves dealing with errors and retransmission of packets to higher layers of communication.

Figure 8:
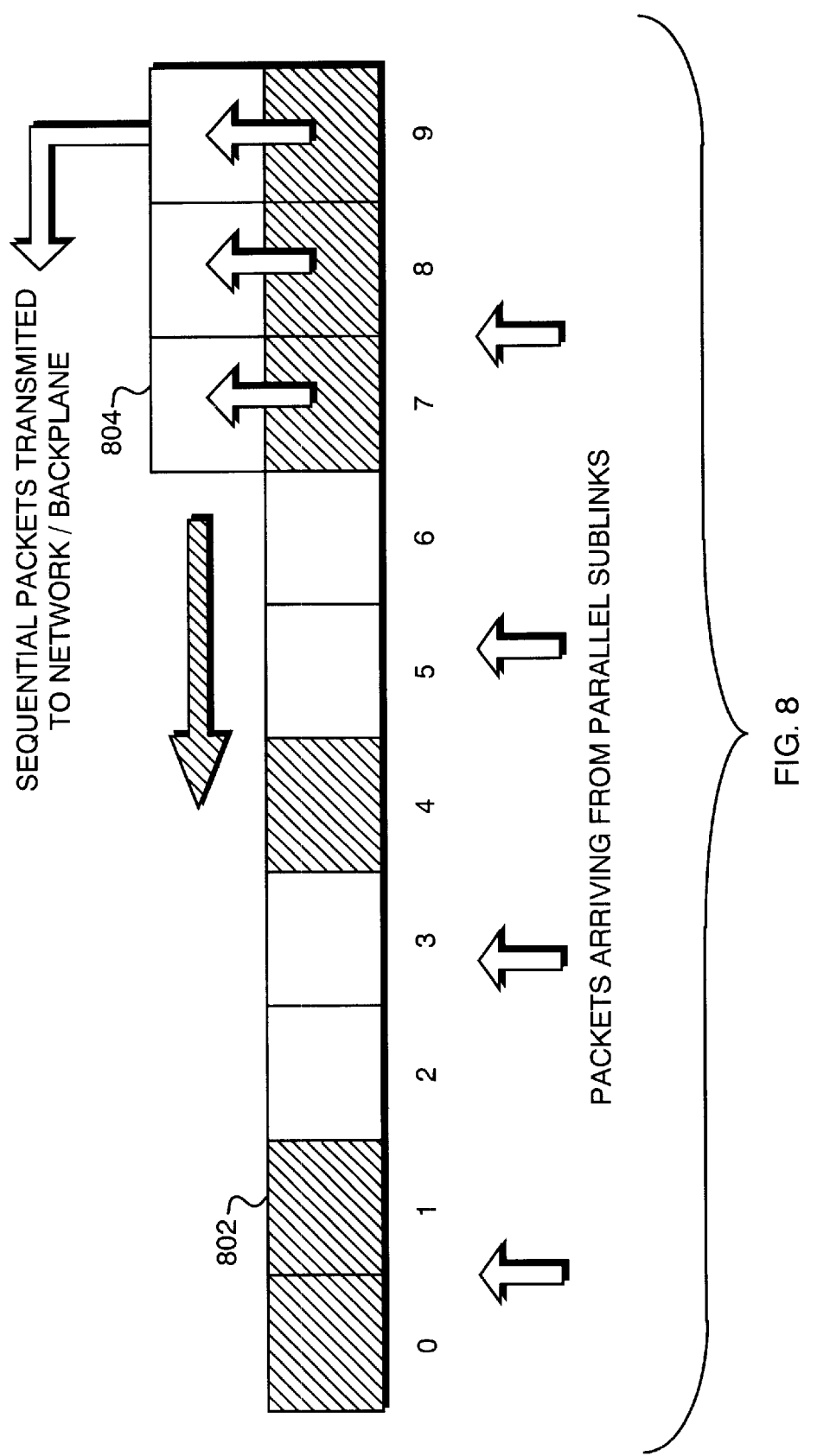
FIG. 8 is a block diagram illustrating the relationship between a window packet buffer and a sliding window on a receiver unit

Referring to FIG. 8, is a block diagram illustrating the relationship between a packet window buffer 802 and a sliding window 804 in a receiver. In this example, packet window buffer 802 includes 10 slots numbered 0–9 for holding packets. Slots 2–3 and 5–6 do not yet contain packets. The packets which belong in these slots may be en route over the network or may have been lost during transmission.

Sliding window 804 indicates that slots 7–9 in packet window buffer 802 have a contiguous sequence of packets. The packet at the right most portion of sliding window 804 (i.e. the packet in slot 9) can be transmitted over a single link connected to the receiver. As more packets arrive, sliding window 804 moves left towards the newly arrived packets in window packet buffer 802. If the size of sliding window is adjusted correctly, packets covered by sliding window 804 are in sequence and available for transmission. If sliding window 804 encounters a slot in packet window buffer 802 that does not have a packet, such as slot 6, sliding window 804 will stop advancing for a predetermined time interval or until the out of order packet has arrived.

The size of sliding window 804 is determined based upon at least two different metrics. A first metric depends on the size of the packets transmitted and the number of sublinks used in the network. This relationship can be expressed as:

$$WindowSize = (MaxPS \div MinPS) \times (SC)$$

Where:

| | |
|---|---|
| MaxPs | Maximum packetsize transmitted over the parallel sublinks |
| MinPS | Minimum packetsize transmitted over the parallel sublinks |
| SC | Number of sublinks used in parallel to transmit packets of data |

For example, assume some packets transmitted over a network are 64 Kb in size and other packets transmitted over the network are only 64 byte packets. Further, assume that the network utilizes 1000 OC-48c sublinks for an approximate bandwidth of 2.5 Terrabits/second. During the time interval it takes to transmit the largest packet over one link, some multiple of the smallest packets can be transmitted over other parallel links. In this example, 1000 64 byte packets can be transmitted over roughly 1000 parallel links in the time period it takes to transmit one 64 K byte packet over a single link. Accordingly, the window size should be set to accommodate approximately 1 million packet entries.

The second metric used to adjust sliding window 804 is related to maximum variance between parallel sublinks in a network. Essentially, sliding window 804 must be increased in size to accommodate the maximum variance in the delay between sublinks. For example, given 1000 OC-48c sublinks discussed above it would be necessary to add approximately 5 million additional packet entries for a 1 Millisecond variance. Thus, in an exemplary embodiment additional packet entries can be reduced significantly by designing transceivers having maximum variances of several Microseconds.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, although the transmitter and receiver designed in accordance with the present invention appear in separate figures, a transceiver combining designs from both the transmitter and receiver could be created. In another example, estimating the size of the sliding window on the receiver can be improved by sending the approximate time to transmit the previous packet with each current packet transmitted. Alternatively, estimating the size of the sliding window can be improved by transmitting the size of each subsequent packet with each current packet transmitted. In addition to enabling computers to communicate over parallel communication links, similar concepts can be applied to enable other devices transmit variable size data packets over parallel communication links such as network attached storage devices. For example, a set of disk drives connected to a network through a corresponding set of parallel communication sublinks can transmit data in parallel over the sublinks to a receiver unit that reorders the data at a later time. This transmits data in parallel quickly at the expense of additional processing later at a receiver unit. Further, the described implementation includes software but the present invention may be implemented as a combination of hardware and software or in hardware alone. Moreover, the scope of the invention is broadly defined by the claims below and the full scope of their equivalents.

What is claimed is:

1. An apparatus for performing packet based data communications executed on a processor unit operatively coupled to a single sublink to receive data and a link comprising two or more communication sublinks to transmit data, comprising:

means for receiving data packets over the single sublink;
   means for establishing the two or more communication sublinks of the link using Wave Length Division Multiplexing;
   means for separating the two or more communication sublinks of the link into a busy set of sublinks and an available set of sublinks; and
   means for transmitting the data packets received over the single sublink by striping the one or more packets of data over the sublinks in the available set of sublinks.

2. An apparatus for performing packet based data communications executed on a processor unit operatively coupled to a link comprising two or more communication sublinks to receive data and a single sublink to transmit data, comprising:

means for establishing the two or more communication sublinks of the link using Wave Length Division Multiplexing;
   means for determining which sublinks of the link are in an available set of sublinks and which sublinks are in a busy set of sublinks;
   means for receiving packets of data over the available set of sublinks;
   means for extracting packets of data received in parallel over the available sublinks; and
   means for transmitting the packets of data serially over the single sublink at a bandwidth at least greater than the bandwidth associated with any one of the available sublinks.

3. A method for performing packet based data communications executed on a processor unit operatively coupled to a single sublink to receive data and a link comprising two or more communication sublinks to transmit data, the method comprising:

receiving data packets over the single sublink;
   establishing the two or more communication sublinks of the link using Wave Length Division Multiplexing;
   separating the two or more communication sublinks of the link into a busy set of sublinks and an available set of sublinks; and
   transmitting the data packets received over the single sublink by striping the one or more packets of data over the sublinks in the available set of sublinks.

4. The method of claim 3, wherein the processor unit is an application specific integrated circuit (ASIC).

5. The method of claim 3, wherein the processor unit is a field programmable gate array (FPGA).

6. The method of claim 3, wherein the transmitting step further comprises the steps of:

inserting a packet sequence number in a header associated with each packet;
   associating one or more packets of data with sublinks from the available sublink set; and
   synchronously transmitting the one or more packets of data in parallel over the corresponding sublinks in the available sublink set.

7. The method of claim 3, wherein the separating step further comprises the steps of:

delaying until there is a sublink in the set of available sublinks available for transmitting data packets;
   determining which sublinks in the available set of sublinks are available for transmitting data packets;
   associating a sublink with the available set of sublinks when a sublink is available for transmitting packets of data; and
   associating a sublink with a busy sublink set when a sublink is not available for transmitting packets of data.

8. The method of claim 3 performed on a data storage device attached to a network through the two or more communication sublinks.

9. The method of claim 3, wherein the link comprises an optical fiber link.

10. The method of claim 9, wherein the communication sublinks of the link are further established using a plurality of laser devices transmitting data over different wavelengths.

11. A method for performing packet based data communications executed on a processor unit operatively coupled to a link comprising two or more communication sublinks to receive data and a single sublink to transmit data, the method comprising:

establishing the two or more communication sublinks of the link using Wave Length Division Multiplexing;
   determining which sublinks of the link are in an available set of sublinks and which sublinks are in a busy set of sublinks;
   receiving packets of data over the available set of sublinks;
   extracting packets of data received in parallel over the available sublinks; and
   transmitting the packets of data serially over the single sublink at a bandwidth at least greater than the bandwidth associated with any one of the available sublinks.

12. The method of claim 11, wherein the extracting step further comprises the step of sequencing the packets based upon a packet sequence associated with each of the one or more packets of data.

13. The method of claim 12, wherein the sequencing step further comprises the steps of:

extracting a packet sequence from each packet of data; and
   ordering the packets, based upon the packet sequence, in numeric order wherein gaps in the sequence may be caused by packets that arrived out of order.

14. The method of claim 13, wherein the ordering step further comprises the steps of:

generating a predetermined set of packet sequences corresponding to the range of packet sequences in the received packets;
   associating a sliding window with the predetermined set of packet sequences; and
   providing a sequence of packets when at least one received packet has a sequence number within the predetermined set of packet sequences.

15. The method of claim 14 further comprising the step of delaying a predetermined time period when no received packet has a sequence number within the predetermined sequence of packets.

16. The method of claim 11 performed on a data storage device attached to a network through the two or more communication sublinks.

17. The method of claim 11, wherein the link comprises an optical fiber link.

18. The method of claim 17, wherein the communication sublinks of the link are further established using a plurality of laser devices transmitting data over different wavelengths.

19. A method for performing packet based data communications executed on a processor unit operatively coupled to a single sublink to receive data and a link comprising two or more communication sublinks to transmit data, the method comprising:

receiving data packets over the single sublink;

separating the two or more communication sublinks of the link into a busy set of sublinks and an available set of sublinks, the separating step further comprising:

delaying until there is a sublink in the set of available sublinks available for transmitting data packets, determining which of the sublinks in the available set of sublinks are available for transmitting data packets, associating a sublink with the available set of sublinks when a sublink is available for transmitting packets of data, and associating a sublink with the busy set of sublinks when a sublink is not available for transmitting packets of data, and transmitting the data packets received over the single sublink by striping the one or more packets of data over the sublinks in the available set of sublinks.

20. A method for performing packet based data communications executed on a processor unit operatively coupled to a link comprising two or more communication sublinks to receive data and a single sublink to transmit data, the method comprising:

determining which of the sublinks of the link are in an available set of sublinks and which of the sublinks are in a busy set of sublinks;

receiving packets of data over the available set of sublinks;

extracting packets of data received in parallel over the available sublinks, the extracting including sequencing the packets based upon a packet sequence associated with each of the one or more packets of data, the sequencing step further comprising:

extracting a packet sequence from each packet of data, and ordering the packets, based upon the packet sequence, in numeric order, gaps in the sequence being caused by packets that arrived out of order, the ordering comprising:

generating a predetermined set of packet sequences corresponding to a range of packet sequences in the received packets, associating a sliding window with the predetermined set of packet sequences, and providing a sequence of packets when at least one of the received packets has a sequence number within the predetermined set of packet sequences; and transmitting the packets of data serially over the single sublink at a bandwidth at least greater than a bandwidth associated with any one of the available sublinks.

* * * * *